I. RILEY.
Water Supply Apparatus for Water-Closets.

No. 165,507. Patented July 13, 1875.

Witnesses.
L. H. Latimer
Wm. Pratt

Inventor
Isaac Riley
PER Crosby Gregory
Att'ys.

UNITED STATES PATENT OFFICE.

ISAAC RILEY, OF BOSTON, MASSACHUSETTS, ASSIGNOR TO BAIRD & RILEY, OF SAME PLACE.

IMPROVEMENT IN WATER-SUPPLY APPARATUS FOR WATER-CLOSETS.

Specification forming part of Letters Patent No. 165,507, dated July 13, 1875; application filed March 17, 1875.

*To all whom it may concern:*

Be it known that I, ISAAC RILEY, of Boston, in the county of Suffolk and State of Massachusetts, have invented an Improved Water-Supply Apparatus for Water-Closets, of which the following is a specification:

This apparatus causes flow of water into a tank by pressure upon a yielding seat, the flow being constant during the period of such pressure, until the desired maximum quantity is stored in the tank. At the same time the construction is such that the seat is free to be raised when it is desirable to use the water-closet as a urinal or as a slop-receptacle.

Instead of maintaining a constant supply of water in a large and consequently expensive tank, I make use of a tank only large enough to contain the quantity of water needed to thoroughly wash the closet, and to permit the operation of a float and its lever, by which the supply-valve is operated, and by use of the tank I avoid too violent a rush of water into the closet, which takes place where the water-connection is direct from the water-service pipe, as in most of such cases the pressure on the pipe is much greater than is desirable for this purpose, enough pressure being obtained from a tank elevated about six feet above the discharge.

Figure 1:
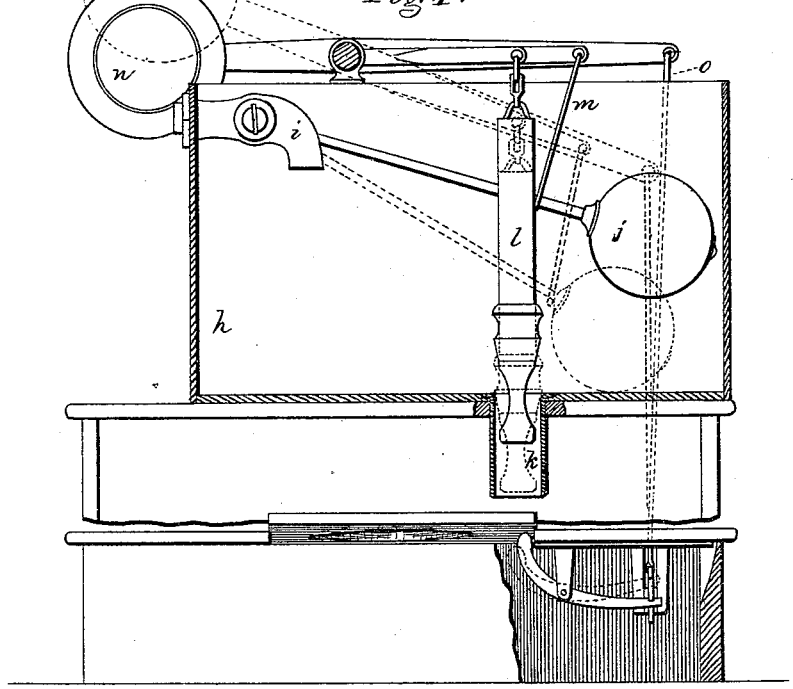
Figure 2:
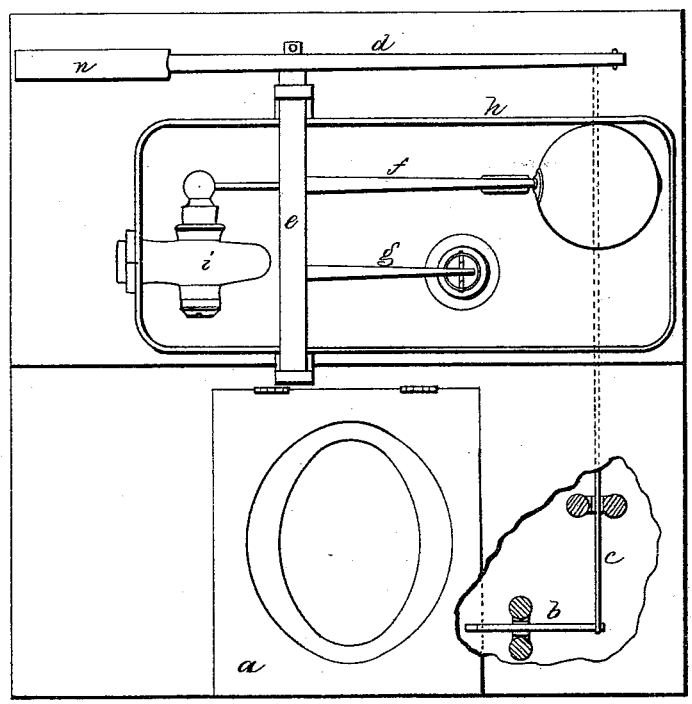

Figure 1 of the drawing shows my improved apparatus in sectional elevation, and Fig. 2 in plan.

$a$ is the ordinary seat, hinged at its rear, and bearing upon near its front, and held slightly elevated by, a lever, $b$, which is connected with lever $c$, which is connected by a link, $o$, with the weighted lever $d$, (the weight thereon being marked $n$,) fixed on the rocker-shaft $e$, to which shaft are fixed the radius-arms $f$ and $g$, the bearings of the rocker-shaft being fixed preferably to the tank $h$, which has a water-supply-controlling valve, $i$, passage through which is governed by the position of the float $j$. The water-supply for the water-closet is taken from the bottom of the tank through the pipe $k$, the upper part of which acts as a seat for the valve, which is made by enlargement of the pipe $l$, the lower part of said pipe entering the pipe $k$, thus making an effective guide for properly seating the valve, while the upper part of pipe $l$, being open, acts as a safety overflow in case of contingencies. The lower end of pipe $l$ is somewhat cut away to give increased escape area when the escape-valve is lifted. The lever $g$ is connected to the escape-pipe by link-connections, and the lever $f$ is connected to the float-lever by a loop-link.

In Fig. 1 the full lines represent the parts in their normal state of non-action with the supply-valve closed, the escape-valve open, and the tank free from water, and the dotted lines represent the position of the weighted lever and of the escape-valve caused by pressure upon the seat $a$.

The operation of my invention is as follows: When the seat is depressed, it elevates the weight $n$ on lever $d$ by means of the connections shown and described, and in the turning of the rocker-shaft the escape-valve seats itself, and the float $j$ falls by its weight, opening the supply-valve. As water accumulates in the tank the float rises, the loop-link $m$ allowing it to do so until sufficient water has accumulated in the tank to thoroughly wash the closet, when it is allowed to escape, at which point the float has operated to close the inlet-valve, unless in case of disarrangement of the parts which allows continued ingress of water, when it will escape and pass off through the upper open end of pipe $l$. When pressure is removed from the seat $a$, the gravitation of the weight $n$ on lever $d$ turns the rocker-shaft $e$, and raises the seat and the float $j$ by means of loop $m$, if not already in its highest position, and lifts the escape-valve, causing flow of the water in the tank through the closet.

The apparatus is efficient, not liable to disarrangement or accident, and is economical in the use of water, as has been proved by practical use. The weight on lever $d$ might be replaced by a spring, though I prefer a weight, as shown, as being less liable to derangement.

By the apparatus described it will be seen that whenever the seat is depressed for a short time, I secure in the tank a given sufficient supply of water for cleansing the water-closet, which will pass to and through it as soon as the seat is relieved from pressure; that this supply will not exceed the amount determined by the adjustment of the apparatus, even if the pressure upon the seat is maintained for an unusual length of time, and that if the inlet-valve $i$ refuses to shut, owing to oxidation or from any other reason, the water will not overflow the tank, but will pass through the water-closet, and in so doing will give notice of, and will call attention to, the derangement.

I claim—

1. The combination of the elevated tank with the inlet-valve and its operating-lever and float, and the escape-valve and lever, all adapted to operate with relation to each other to stop the flow of water while the seat is depressed, and to permit the discharge of the water from the tank when the seat is relieved, substantially as described.

2. The combination of the seat $a$ with the escape-valve $l$ through intermediate mechanism, arranged to operate substantially as described.

3. The combination of the seat $a$, tank $h$, inlet-valve $i$, and escape-valve $l$, the valves being connected by intermediate mechanism, arranged to operate substantially as described.

In testimony whereof I have signed my name to this specification in the presence of two subscribing witnesses.

ISAAC RILEY.

Witnesses:
   J. B. CROSBY,
   S. B. KIDDER.